(12) United States Patent
Backaert et al.

(10) Patent No.: US 9,370,777 B2
(45) Date of Patent: Jun. 21, 2016

(54) FOOD MINCER

(71) Applicant: Dart Industries Inc., Orlando, FL (US)

(72) Inventors: Dimitri M. C. J. Backaert, Moorsel (BE); Judicaël Cornu, Brussels (BE); Frederick M. N. De Pauw, Delnze (BE); Babara R. M. Huet, Ixelles (BE); Michiel G. P. H. E. Vanneste, Aalst (BE); Yan Kwong Wong, Kowloon (HK)

(73) Assignee: Dart Industries, Inc., Orlando, FL (US)

( * ) Notice: Subject to any disclaimer, the term of this patent is extended or adjusted under 35 U.S.C. 154(b) by 201 days.

(21) Appl. No.: 14/071,624

(22) Filed: Nov. 4, 2013

(65) Prior Publication Data
US 2015/0122928 A1    May 7, 2015

(51) Int. Cl.
| *B02C 18/30* | (2006.01) |
| *F16B 47/00* | (2006.01) |
| *A47J 45/02* | (2006.01) |
| *F16B 1/00*  | (2006.01) |

(52) U.S. Cl.
CPC .............. *B02C 18/305* (2013.01); *A47J 45/02* (2013.01); *F16B 1/0071* (2013.01); *F16B 47/006* (2013.01); *B02C 18/30* (2013.01); *F16B 47/00* (2013.01)

(58) Field of Classification Search
CPC ........... A47J 45/02; A47J 42/48; A47J 42/38; A47J 42/50; A47J 43/04; B02C 18/305; B02C 18/30; B02C 18/18; B02C 18/301; B02C 18/36; B02C 18/38; B02C 2018/0046; B02C 2018/162; A47G 29/087; F16B 47/006; F16B 21/02; F16B 21/06; F16B 1/0071; F16B 47/00; Y10T 24/45005; Y10T 24/45089; Y10T 24/45639
See application file for complete search history.

(56) References Cited

U.S. PATENT DOCUMENTS

| 2,337,604 | A | * | 12/1943 | Hess | .............................. 241/82.5 |
| 3,376,910 | A | | 4/1968 | Popeil | |
| 5,970,860 | A | | 10/1999 | Yip | |
| D474,369 | S | | 5/2003 | Benzon et al. | |
| 7,207,510 | B2 | | 4/2007 | Wong | |
| 2006/0243837 | A1 | * | 11/2006 | Wong | .............................. 241/82.1 |
| 2012/0152131 | A1 | * | 6/2012 | Sands | .............................. 99/510 |

OTHER PUBLICATIONS

European Search Report, Application No. EP 14 19 1400, completed Feb. 25, 2015.*
Tefal® Fresh Express Food Processor; Model #MB754540; Jun. 20, 2013.

* cited by examiner

*Primary Examiner* — Alexander P Taousakis
*Assistant Examiner* — Leonel Vasquez
(74) *Attorney, Agent, or Firm* — Taylor J. Ross

(57) ABSTRACT

A food mincer providing improved features. The suction base includes a control ring providing an improved visual indication of its position. The plunger to feed the food is formed as a hollow container having a sealing lid to provide a storage area for accessories. The feed screw is formed in a multi-step molding process to allow for closer tolerances, which in turn allows for a simple gasket seal to be used. The feed screw and fan blade include a mating configuration only when the fan blade is in the proper orientation, such that if the fan blade is assembled in the incorrect orientation the extrusion grids may not be assembled.

8 Claims, 6 Drawing Sheets

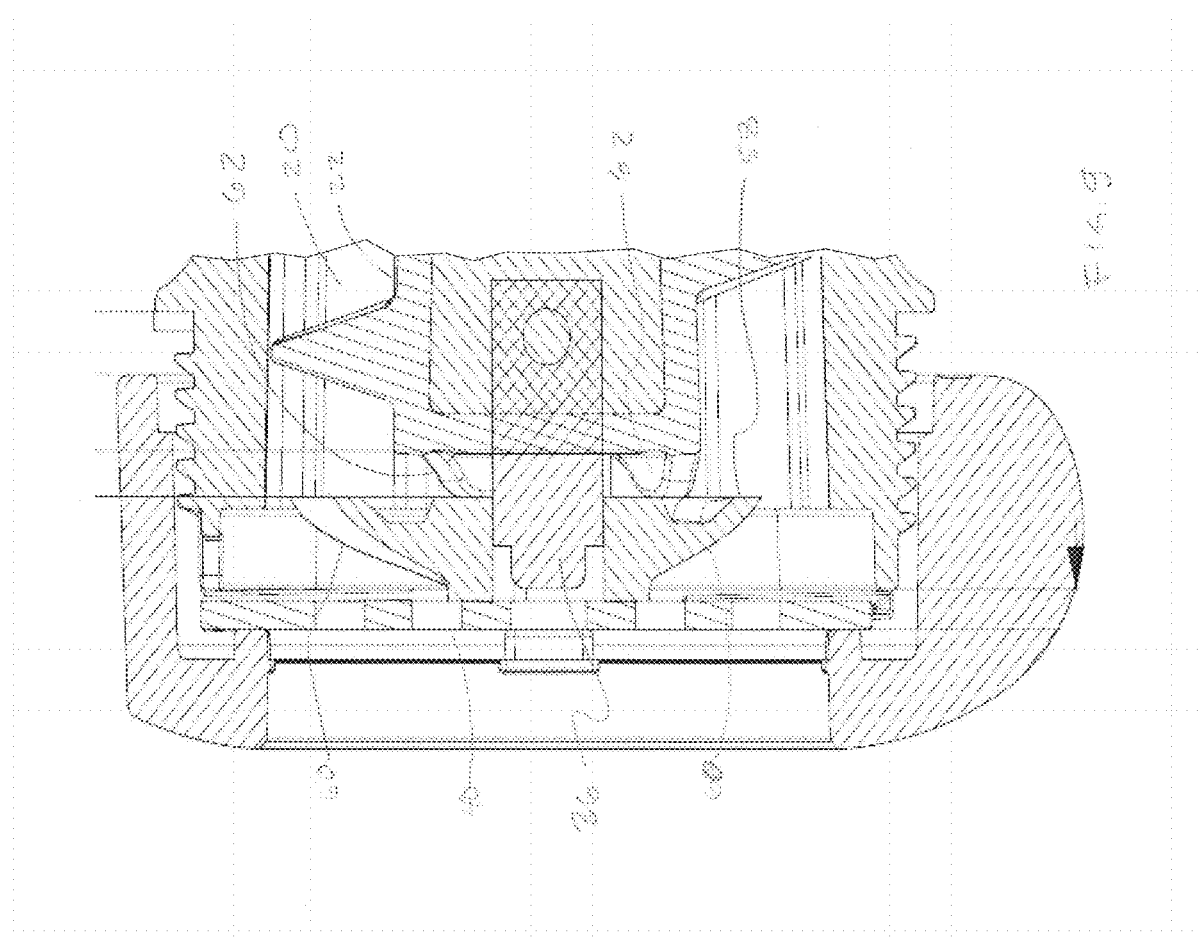

FOOD MINCER

CROSS REFERENCE TO RELATED APPLICATIONS

This application is related to co-pending application Ser. No. 29/471,646, and co-pending application Ser. No. 29/471,648, which are both incorporated by reference herein.

STATEMENT REGARDING FEDERALLY SPONSORED RESEARCH

Not applicable.

BACKGROUND OF THE INVENTION

The present invention relates in general to kitchen appliances, and more particularly food mincers. The food mincer includes a novel plunger which includes a sealed storage area therein. The food mincer includes a novel activation ring for securing the mincer to the countertop. The food mincer also includes a novel screw arrangement permitting a reduction in parts. The food mincer further includes a novel blade fan connection which will ensure proper assembly.

Food mincers for home and light commercial use are well known in the art. An example of such a mincer is illustrated in U.S. Pat. No. 7,207,510 B2 to Yan Kwok Wong. This prior art mincer includes a pedestal which will removably mount a mincer unit (or other appliances). The pedestal includes a suction plate at the bottom which will releasably secure the pedestal to a countertop. In this device the suction plate is activated by manual rotation of a ring running peripherally about the pedestal. While this is an improvement over other mechanisms for activating a suction plate, it still has a drawback. Specifically, it is not clear from simply looking at the ring if it is in the secure or unsecured position. In practice it is necessary to print indicia on the pedestal to clarify this. Not only does this create an additional manufacturing step, but with use it is common for the indicia to wear off.

SUMMARY OF THE INVENTION

An object of the present invention is to provide a suction base for countertop appliances which includes a control ring with improved visual indication of position.

Another object of the present invention is to provide a food mincer having a plunger providing a sealed storage area.

A further object of the present invention is to provide a food mincer having an improved feed screw allowing closer tolerances and less complicated sealing.

Yet another object of the present invention is to provide a food mincer with improved fan blade mounting which prevent improper assembly.

These and other objects are achieved by a food mincer providing improved features. The suction base includes a control ring providing an improved visual indication of its position. The plunger to feed the food is formed as a hollow container having a sealing lid to provide a storage area for accessories. The feed screw is formed in a multi-step molding process to allow for closer tolerances, which in turn allows for a simple gasket seal to be used. The feed screw and fan blade include a mating configuration only when the fan blade is in the proper orientation, such that if the fan blade is assembled in the incorrect orientation the extrusion grids may not be assembled.

BRIEF DESCRIPTION OF THE DRAWINGS

The objects and features of the invention noted above are explained in more detail with reference to the drawings, in which like reference numerals denote like elements, and in which:

FIG. 9 is a detail cross-sectional side view showing the fan blade assembled in the incorrect orientation.

DETAILED DESCRIPTION OF THE INVENTION

Figure 1:
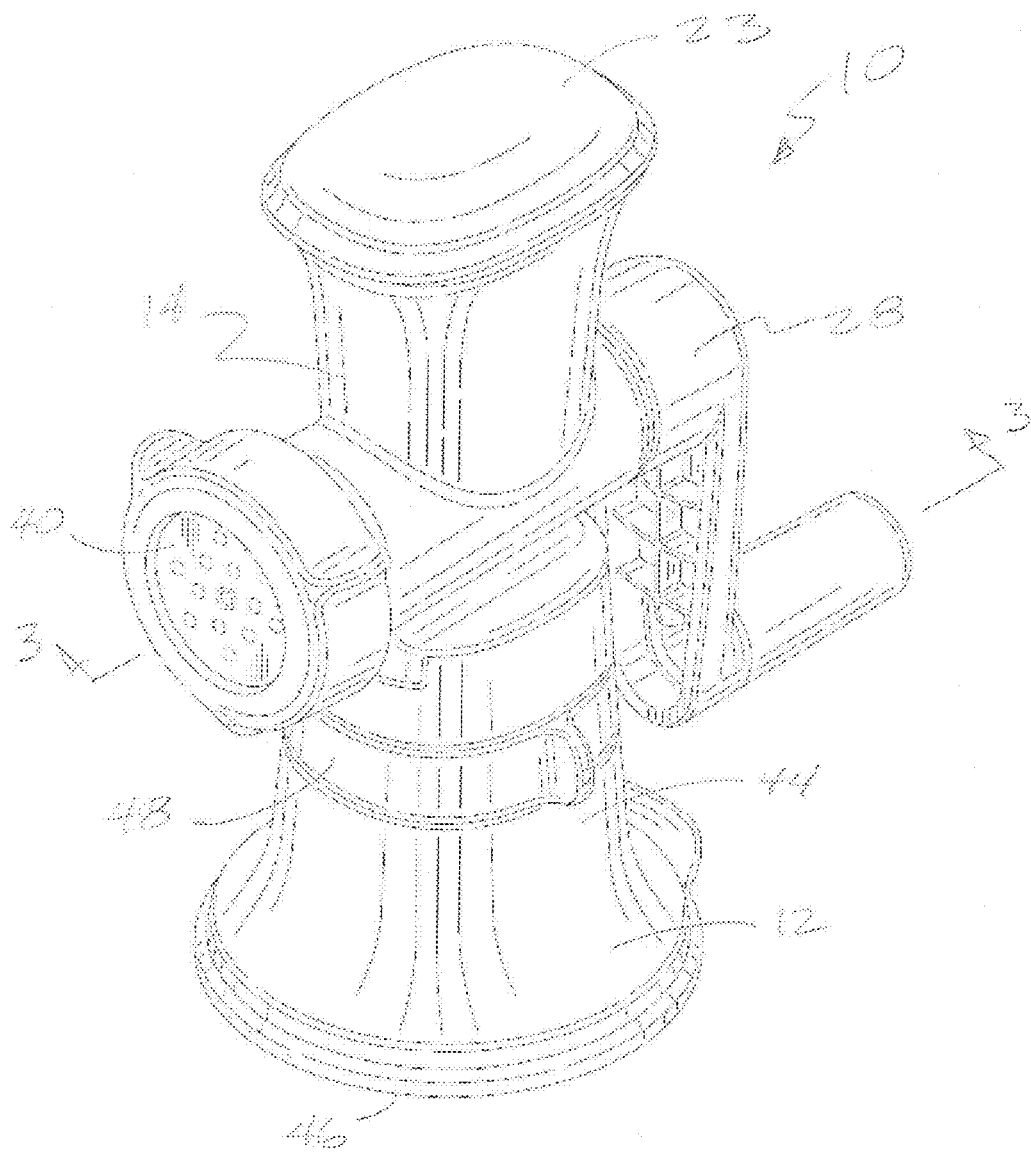
FIG. 1 is a top front perspective view of the food mincer according to the present invention in the operative configuration.
Figure 2:
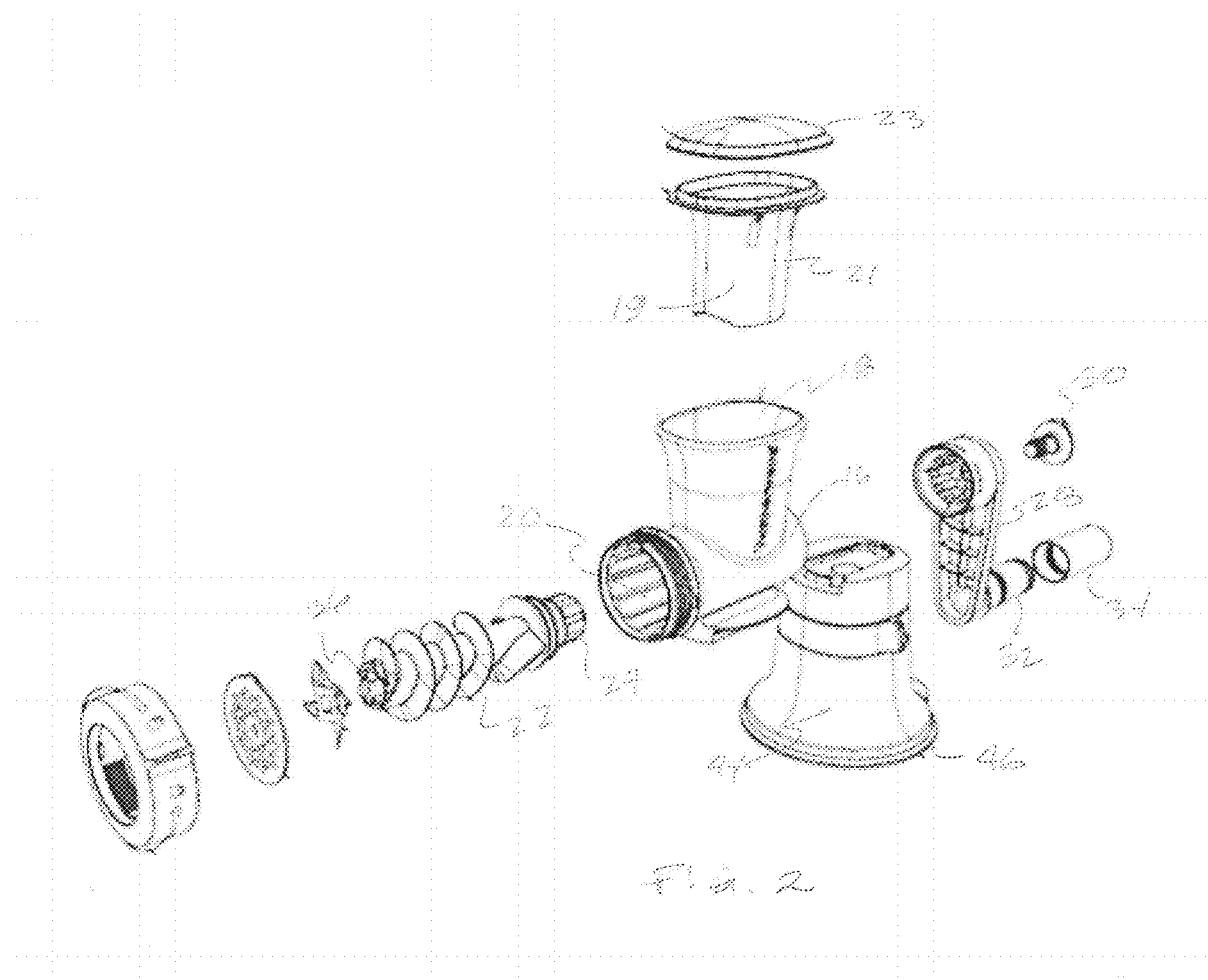
FIG. 2 is a top front exploded perspective view of the food mincer.

With reference to FIG. 1, a food mincer according to the present invention is generally designated by reference numeral 10. The food mincer 10 generally includes a suction base 12 and a mincer attachment 14. These two components are both similar in many respects to the base and mincer shown in U.S. Pat. No. 7,207,510 B2 to Yan Kwok Wong which is included herein by reference.

Figure 3:
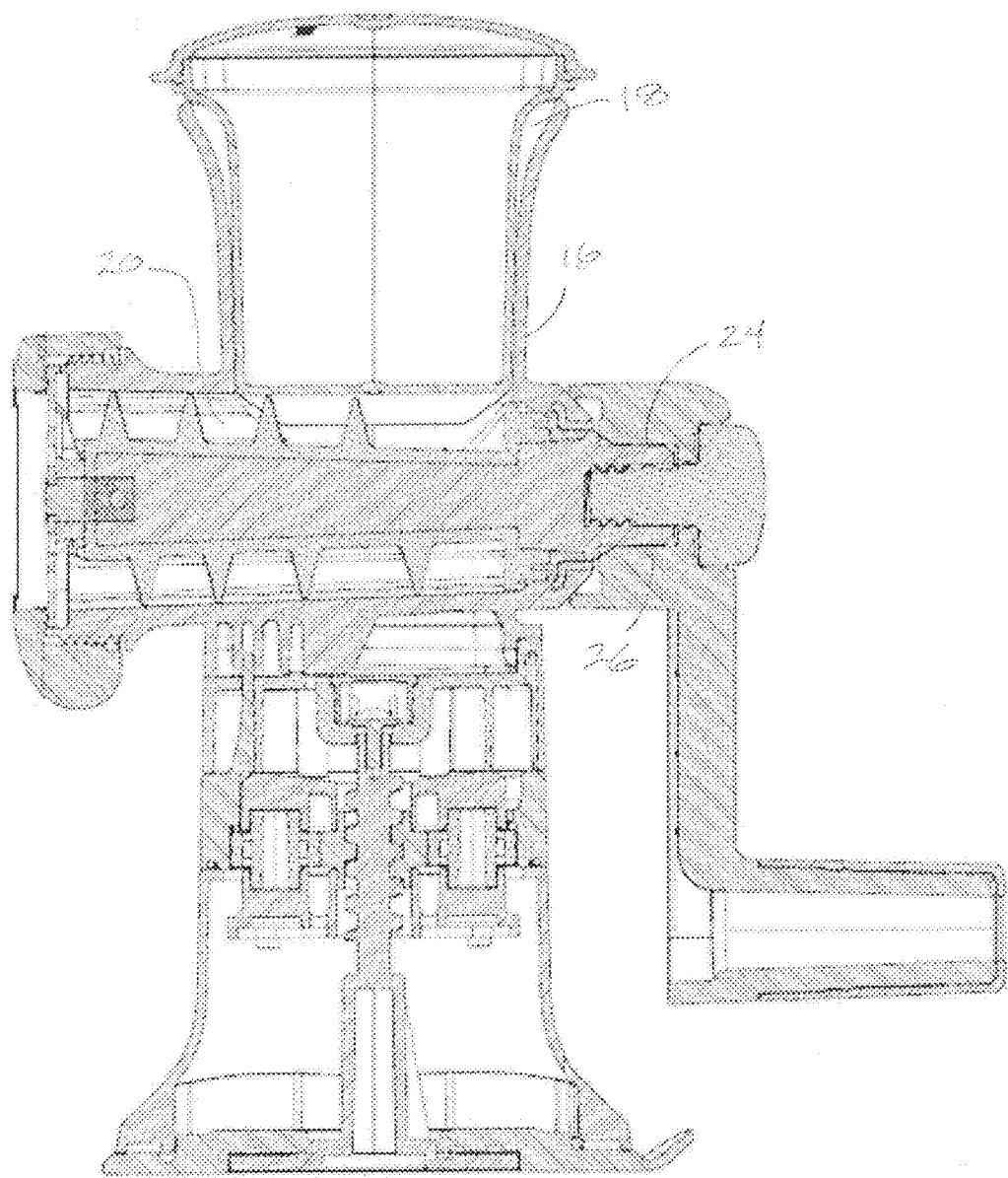
FIG. 3 is a cross-sectional side view along line 3-3 of FIG. 1.

The mincer assembly 14 includes a main housing 16 having a vertical feed chute 18 leading to a horizontal screw chamber 20. The screw chamber 20 receives a feed screw 22 which includes a splined rear end 24 which extends through a crank aperture 26 (FIG. 3). A crank handle 28 includes at a first end a connector having mating slots to receive the rear end 24, and a handle mounting screw 30 extends through the connector to secure within a threaded opening in the rear end 24. The other end of the crank handle 28 include a projecting rod 32 which will receive a crank sleeve 34 thereover in a snap fit allowing relative rotation.

The front end of the feed screw 22 includes a mounting rod 36 projecting longitudinally outward. A fan blade 38 includes a central aperture shaped to closely receive the mounting rod 36, such that the fan blade 38 will rotate together with the feed screw 22. When properly assembled, the cutting edges of the fan blade are spaced within the screw chamber 20 by a distance substantially and closely equal to that of the thickness of an extrusion grid 40. The extrusion grid 40 is a circular disc preferably but not necessarily including a central aperture receiving a circular end portion of the mounting rod 36, a plurality of apertures through which the food will exit, and an outer diameter sized to fit within and close the front end of the screw chamber 20 as is known in the art. A fixing ring 42 is threaded on to the front end of the main housing 16 to hold the extrusion grid 40 in place.

A first novel aspect of the present invention is the plunger 19 sized to closely fit within the feed chute 18. In the preferred embodiment, the plunger 19 is formed as a sealed container. In particular, the plunger 19 includes a base and sidewalls forming a container body 21, and also a cover 23 which seals to the upper edges of the sidewalls to thus form a sealed container. This sealed container is well sized for storing different sizes of the extrusion grids 40 discussed below.

The suction base 12 includes a main pedestal 44 elongated along a substantially vertical axis and resting upon an elastomeric suction plate 46. A control ring 48 is provided and extends about the periphery of the main pedestal 44, preferably at a point between the upper and lower ends of the main pedestal 44, as shown. In a manner known in the art, the control ring 48 will operatively connect to a central rod having a lower end connected to the suction plate 46.

The control ring 48 is mounted for rotation about the substantially vertical axis of the main pedestal 44 with respect to the main pedestal 44. This rotation will be between two positions (and thus might be better referred to as oscillation). The unlocked position of the control ring 48 corresponds to the central rod being in its lowest position, the suction plate 46 being substantially undeformed, and the suction base 12 not being secured to the countertop. Rotation of the control ring 48 to the locked position will cause the central rod to be lifted, thus deforming the suction plate 46 to create a suction connection to the counter top and thus securing the suction base 12 to the counter top. Rotation of the control ring 48 in the opposite direction back to the unlocked position will release the suction connection. The specific mechanism for this operation may be as shown in the above-noted U.S. Pat. No. 7,207,510 B2 to Yan Kwok Wong, or any other equivalent mechanism.

A novel aspect of the present invention is in providing a clear visual indication of the locked or unlocked status of the control ring 48. To this end, the main pedestal 44 is given a non-circular shape, with at least one line of symmetry. The control ring 48 is configured to closely match the shape of the main pedestal 44 when the control ring 48 is in the locked position. Finally, the amount of rotation to move the control ring from the locked to the unlocked position does not equal the angular distance between the at least one line of symmetry of the main pedestal 44. This ensures that when the control ring 48 is in the unlocked position the control ring will no longer closely match the shape of the main pedestal 44, but will instead have portions extending outwardly of the main pedestal 44, and portions extending inwardly of the main pedestal.

Figure 4:
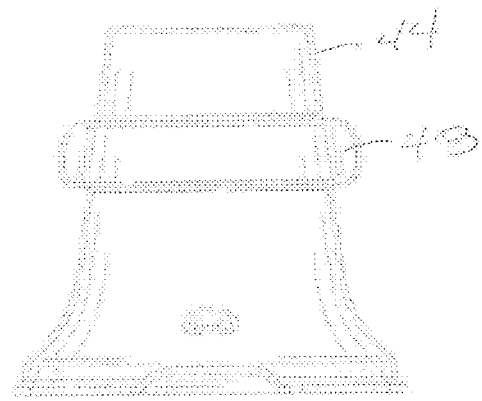
FIG. 4 is a rear view of the suction base with the control ring in the locked position.
Figure 5:
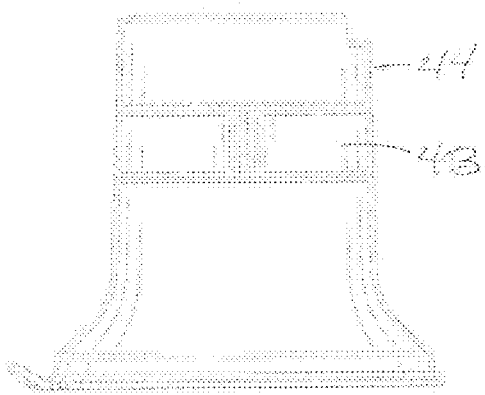
FIG. 5 is a right side view of the suction base with the control ring in the locked position.
Figure 6A:
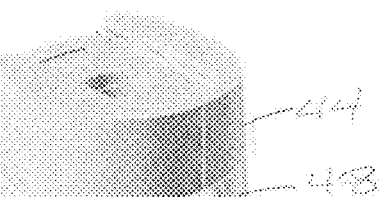
FIG. 6a is a top rear perspective view of the suction base with the control ring in the locked position.
Figure 6B:
FIG. 6b is the same view with the control ring in the unlocked position.

In the embodiment shown, the main pedestal has a generally square shape with four sidewalls. The two front and rear sidewalls are substantially vertical. The two lateral sidewalls, however, are angled outward toward the bottom. As such, the main pedestal has symmetry about 180 degrees. In addition to the operative position of FIG. 1, the control ring 48 is shown in the locked position in FIGS. 4, 5 and 6*b*. In FIG. 6*a*, however, the control ring 48 has been rotated 90 degrees, and as such the angled sides of the control ring 48 are aligned with the vertical sides of the main pedestal 44, and vice versa. This mis-match of the angled and vertical sides provides a clear visual indication to the user that the control ring 48 is in the unlocked position.

Many other variations are possible. If the main pedestal had D-shaped cross section (not shown) the line of symmetry would again be 180 degrees, and the amount of rotation of the control ring would be other than 180 degrees, such as 90 degrees or 270 degrees. As another example, the main pedestal 44 could have a hexagonal cross-sectional shape, such that the lines of symmetry are 60 degrees. The desired amount of rotation for the control ring 48 would therefore be 30 degrees or 90 degrees, etc.

Figure 7:
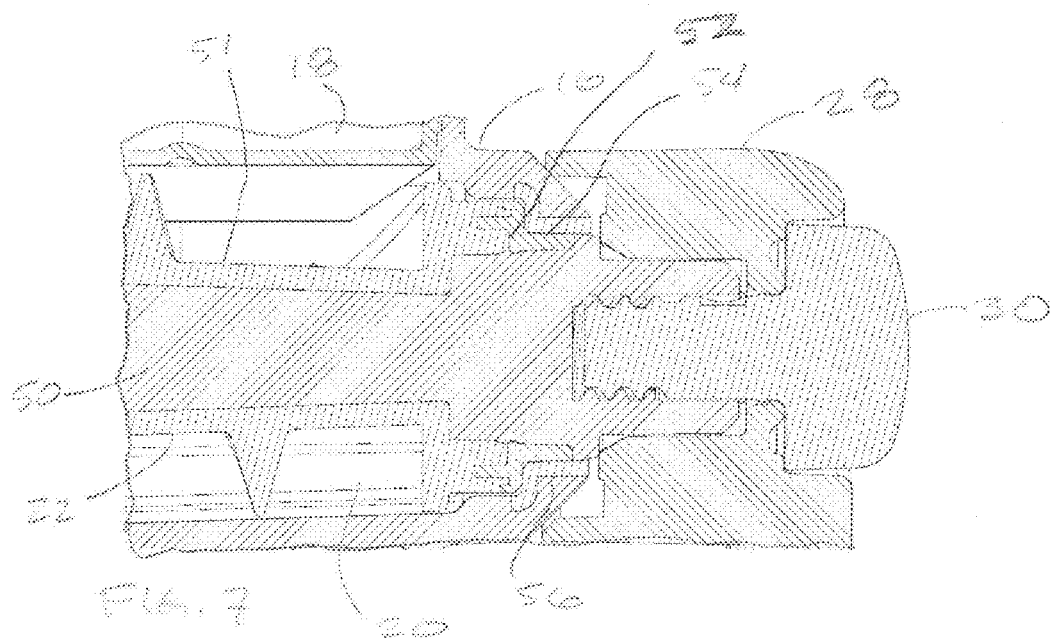
FIG. 7 is a detail cross-sectional side view showing the rear end of the feed screw.

With reference to FIGS. 3 and 7, a further aspect of the invention will be described. For mincers of this type it is important to maintain a good seal between the feed screw 22 and the crank aperture 26. One of the main problems here has been the desire to use injection molded plastic parts, but the difficulty in manufacturing to sufficiently close tolerances. The large variations in the sizes of feed screw 22 has typically required the use of complicated sealing arrangements at the rear end 24 of the feed screw 22, including multiple washers, etc.

The present invention, however, avoids this problem. In particular, the screw 22 is formed in a multi-step molding process. A central core 50 of the feed screw 22 is first formed, from the splined rear end 24 to and including the front end with the partial overmolding of the metal mounting rod 36. Thereafter, a second molding operation forms an outer layer 51 over the core 50, with this outer layer including the threads as well as an annular washer seat 52. The washer seat 52 will in turn mount an annular screw washer 54. While the screw washer could be assembled using a press fit, it is preferred that it be formed during yet another molding operation.

With this arrangement it is possible to provide sufficiently close tolerances that leaking will be kept to acceptable levels. If desired, it is also possible to add an annular mating washer 56 on the main housing 16 surrounding the crank aperture 26.

Another inventive aspect of the present invention is the mounting of the fan blade 38, and in particular an arrangement to ensure the fan blade 38 is mounted properly. The fan blade 38 includes sharp edges which must slide over the inner face of the extrusion grid 40. Only one side of the fan blade 38 has these sharp edges, so it is critical that the fan blade 38 be mounted with the proper orientation.

Figure 8:
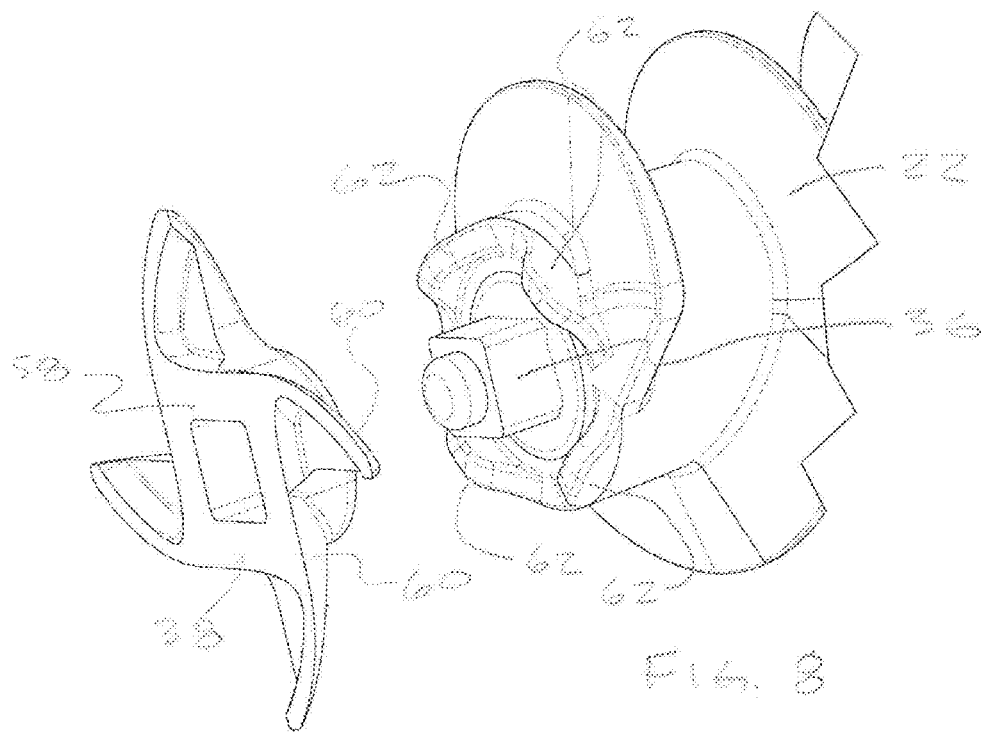
FIG. 8 is a detail exploded top front perspective view showing the mating connection between the screw and the fan blade in the correct orientation.

As best shown in the detail view of FIG. 8, the fan blade 38 includes an outer face 58 which is flat and will slide over the extrusion grid 40. The inner face 60 of each extending blade, however, is rounded. The front end of the feed screw 22 surrounding the mounting rod 36 includes a set of mounting cams 62. As may be envisioned, the inner faces 60 of the blades will rest between the mounting cams 62, allowing the fan blade 38 to seat closely against the front end of the feed screw 22. This close seating in turn allows the extrusion grid 40 to move closely toward the feed screw and thus be received within the front end of the screw chamber 20 as illustrated in FIG. 3.

In contrast, FIG. 9 illustrates the situation where the fan blade 38 has been assembled in the incorrect orientation. In this orientation the outer face 58 is facing the feed screw 22. The flat outer face of the blades is too wide to fit between the mounting cams 62. As such, the fan blade 32 is spaced from the front end of the feed screw 22. When the extrusion grid 40 abuts against the fan blade 38 the extrusion grid 40 is prevented from reaching its seating position in the front end of the screw chamber 20, and will be unstable. This provides a very clear indication to the user that something is wrong, and the food mincer 10 has not been assembled properly.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A suction base, comprising:
a main pedestal having a generally vertical axis and having a cross-section normal to said axis, wherein said cross-section is non-circular;
a suction plate at a bottom of said pedestal; and
a control ring operatively connected to said suction plate and movable in rotation about said axis between a locked position in which said suction plate will secure to a supporting surface by suction, and an unlocked position in which said suction plate will not secure to said supporting surface, said control ring being shaped to form a substantially continuous surface with the main pedestal when said control ring is in said locked position, wherein in the unlocked position, the control ring is in a position that is not in line with a line of symmetry of the cross-section of said main pedestal, such that said control ring is no longer a substantially continuous surface with said main pedestal when in said unlocked position.

2. A suction base as in claim 1, wherein:
said control ring is configured so that when said control ring is in said unlocked position said control ring no longer closely matches the shape of said main pedestal, has portions extending outwardly of said main pedestal, and has portions extending inwardly of said main pedestal.

3. A suction base as in claim 1, wherein:
said control ring is configured to closely match the shape of said main pedestal when said control ring is in said locked position.

4. A suction base as in claim 1, wherein:
said suction plate is elastomeric.

5. A suction base as in claim 1, wherein:
said main pedestal has a generally square cross-section and includes four sidewalls, two of said sidewalls are substantially vertical, and two of said sidewalls are angled outward toward the bottom; and
said control ring comprises angled sides which are angled toward a bottom of said control ring, wherein said control ring is configured so that when said control ring is in said unlocked position said sidewalls which are angled toward said bottom of the control ring are aligned with said vertical sides of said main pedestal, and this alignment of angled and vertical sidewalls provides a clear visual indication to the user that said control ring is in said unlocked position.

6. A food mincer, comprising:
a suction base;
a mincer attachment, said mincer attachment including a feed chute;
a plunger to feed the food into said feed chute;
a feed screw;
a fan blade;
said suction base including a main pedestal having a generally vertical axis and having a cross-section normal to said axis, wherein said cross-section is non-circular;
a suction plate at a bottom of said pedestal; and
a control ring operatively connected to said suction plate and movable in rotation about said axis between a locked position in which said suction plate will secure to a supporting surface by suction, and an unlocked position in which said suction plate will not secure to said supporting surface, said control ring being shaped to form a substantially continuous surface with the main pedestal when said control ring is in said locked position, wherein in the unlocked position, the control ring is in a position that is not in line with a line of symmetry of the cross-section of said main pedestal, such that said control ring is no longer a substantially continuous surface with said main pedestal when in said unlocked position.

7. A food mincer as in claim 6, wherein:
said plunger to feed the food is formed as a hollow container having a sealing lid to provide a storage area for accessories; and
said feed screw is formed in a multi-step molding process to allow for closer tolerances, and a gasket is provided between said feed screw and said mincer attachment.

8. A food mincer as in claim 6, wherein:
an extrusion grid is provided; and
said fan blade includes an outer face which is flat and slides over said extrusion grid, an inner face which is rounded, said feed screw and said fan blade include a mating configuration only when said fan blade is in the proper orientation, and if said fan blade is assembled in the incorrect orientation said extrusion grid may not be assembled.

* * * * *